(12) United States Patent  (10) Patent No.: US 9,281,699 B2
Huang et al.  (45) Date of Patent: Mar. 8, 2016

(54) ELECTRONIC DEVICE TO BE POWERED BY ALTERNATIVE POWER SOURCE

(71) Applicant: INTEL CORPORATION, Santa Clara, CA (US)

(72) Inventors: Lilly Huang, Portland, OR (US); Wayne L. Proefrock, Hillsboro, OR (US); Krishnan Ravichandran, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 315 days.

(21) Appl. No.: 13/728,227

(22) Filed: Dec. 27, 2012

(65) Prior Publication Data

US 2014/0184160 A1   Jul. 3, 2014

(51) Int. Cl.
*H02J 7/00* (2006.01)

(52) U.S. Cl.
CPC .................... *H02J 7/0042* (2013.01)

(58) Field of Classification Search
CPC ................ H02J 7/0042; G05F 5/00
See application file for complete search history.

(56) References Cited

U.S. PATENT DOCUMENTS

| 5,548,200 | A | 8/1996 | Nor et al. |
| 5,640,076 | A | 6/1997 | Youn |
| 6,222,370 | B1 | 4/2001 | Schousek et al. |
| 6,271,643 | B1 | 8/2001 | Becker et al. |
| 6,392,384 | B1 | 5/2002 | Hwang Bo et al. |
| 6,448,742 | B1 | 9/2002 | Waterman et al. |
| 7,023,180 | B2 | 4/2006 | Nagai et al. |
| 7,030,517 | B2 * | 4/2006 | Hansmann et al. ........... 307/150 |
| 7,425,815 | B2 | 9/2008 | Wong et al. |
| 7,432,685 | B2 | 10/2008 | Hayashi |
| 7,446,434 | B1 | 11/2008 | Simmons et al. |
| 7,498,769 | B1 | 3/2009 | Potanin et al. |
| 7,514,900 | B2 | 4/2009 | Sander et al. |
| 7,535,122 | B2 | 5/2009 | Visairo-Cruz et al. |
| 7,560,829 | B2 | 7/2009 | Proefrock et al. |
| 7,573,235 | B2 | 8/2009 | Hand |
| 7,615,965 | B2 | 11/2009 | Popescu-Stanesti et al. |
| 7,622,898 | B2 | 11/2009 | Shimizu et al. |
| 7,698,575 | B2 | 4/2010 | Samson |
| 7,759,906 | B2 | 7/2010 | Ferguson |
| 7,790,307 | B2 | 9/2010 | Kim |
| 7,870,916 | B2 | 1/2011 | Carter |
| 7,893,657 | B2 | 2/2011 | Chavakula |
| 8,120,312 | B2 | 2/2012 | Bucur et al. |
| 8,174,313 | B2 | 5/2012 | Vice |
| 8,242,742 | B2 | 8/2012 | Kao et al. |
| 8,339,105 | B2 | 12/2012 | Maleyran et al. |
| 8,368,345 | B2 | 2/2013 | Wahlqvist et al. |
| 8,400,162 | B1 | 3/2013 | Jannson et al. |

(Continued)

OTHER PUBLICATIONS

U.S. Appl. No. 13/538,265, filed Jun. 29, 2012, Huang et al.

(Continued)

*Primary Examiner* — Nha Nguyen
(74) *Attorney, Agent, or Firm* — KED & Associates LLP

(57) ABSTRACT

A mobile device may be provided that includes an input port, an adjusting device, and a voltage regulator. The input port may receive power from an alternative power source or a DC power supply. The mobile device may receive the power from the input port, adjust a power characteristic of the power, and provide the power having the adjusted power characteristic. The voltage regulator may receive the adjusted power and provide a regulated voltage to a load.

10 Claims, 4 Drawing Sheets

(56) References Cited

U.S. PATENT DOCUMENTS

| | | |
|---|---|---|
| 8,450,980 B2 | 5/2013 | Kumar et al. |
| 8,482,260 B2 | 7/2013 | Hsieh et al. |
| 8,581,550 B2 | 11/2013 | Lin et al. |
| 8,587,251 B2 | 11/2013 | Nakashima et al. |
| 8,773,077 B1 | 7/2014 | Elmes et al. |
| 8,903,456 B2 | 12/2014 | Chu et al. |
| 2001/0034807 A1 | 10/2001 | Takaoka et al. |
| 2003/0057920 A1 | 3/2003 | Dotzler |
| 2005/0141154 A1 | 6/2005 | Consadori et al. |
| 2006/0256989 A1 | 11/2006 | Olsen et al. |
| 2009/0128086 A1 | 5/2009 | Lee |
| 2009/0212222 A1 | 8/2009 | Kito et al. |
| 2011/0029703 A1 | 2/2011 | Huo et al. |
| 2011/0062913 A1 | 3/2011 | Lin et al. |
| 2011/0109261 A1 | 5/2011 | Chavakula |
| 2011/0133700 A1 | 6/2011 | Martin et al. |
| 2011/0138197 A1 | 6/2011 | Lakshmanan et al. |
| 2012/0021807 A1 | 1/2012 | Book et al. |
| 2012/0091968 A1 | 4/2012 | Heo et al. |
| 2012/0098350 A1* | 4/2012 | Campanella et al. ......... 307/104 |
| 2012/0176078 A1 | 7/2012 | English et al. |
| 2012/0187897 A1* | 7/2012 | Lenk et al. .................... 320/101 |
| 2012/0197341 A1 | 8/2012 | Cowley et al. |
| 2012/0280648 A1 | 11/2012 | Hwang et al. |
| 2013/0290743 A1* | 10/2013 | Lee et al. ...................... 713/300 |
| 2014/0001849 A1 | 1/2014 | Huang et al. |
| 2014/0056041 A1 | 2/2014 | Zhu et al. |
| 2014/0062395 A1 | 3/2014 | Kwon et al. |
| 2014/0184160 A1 | 7/2014 | Huang et al. |

OTHER PUBLICATIONS

U.S. Appl. No. 13/730,561, filed Dec. 28, 2012, Huang et al.
U.S. Appl. No. 13/728,268, filed Dec. 27, 2012, Proefrock et al.
International Search Report and Written Opinion for PCT/US2013/060394 dated Dec. 27, 2013.
U.S. Appl. No. 13/730,561 dated Feb. 9, 2015.
U.S. Appl. No. 13/538,265 dated Mar. 5, 2015.
U.S. Office Action for U.S. Appl. No. 13/538,265 dated Sep. 22, 2014.
U.S. Notice of Allowance for U.S. Appl. No. 13/730,561 dated Jul. 22, 2015.
U.S. Office Action for U.S. Appl. No. 13/728,268 dated Jun. 29, 2015.

* cited by examiner

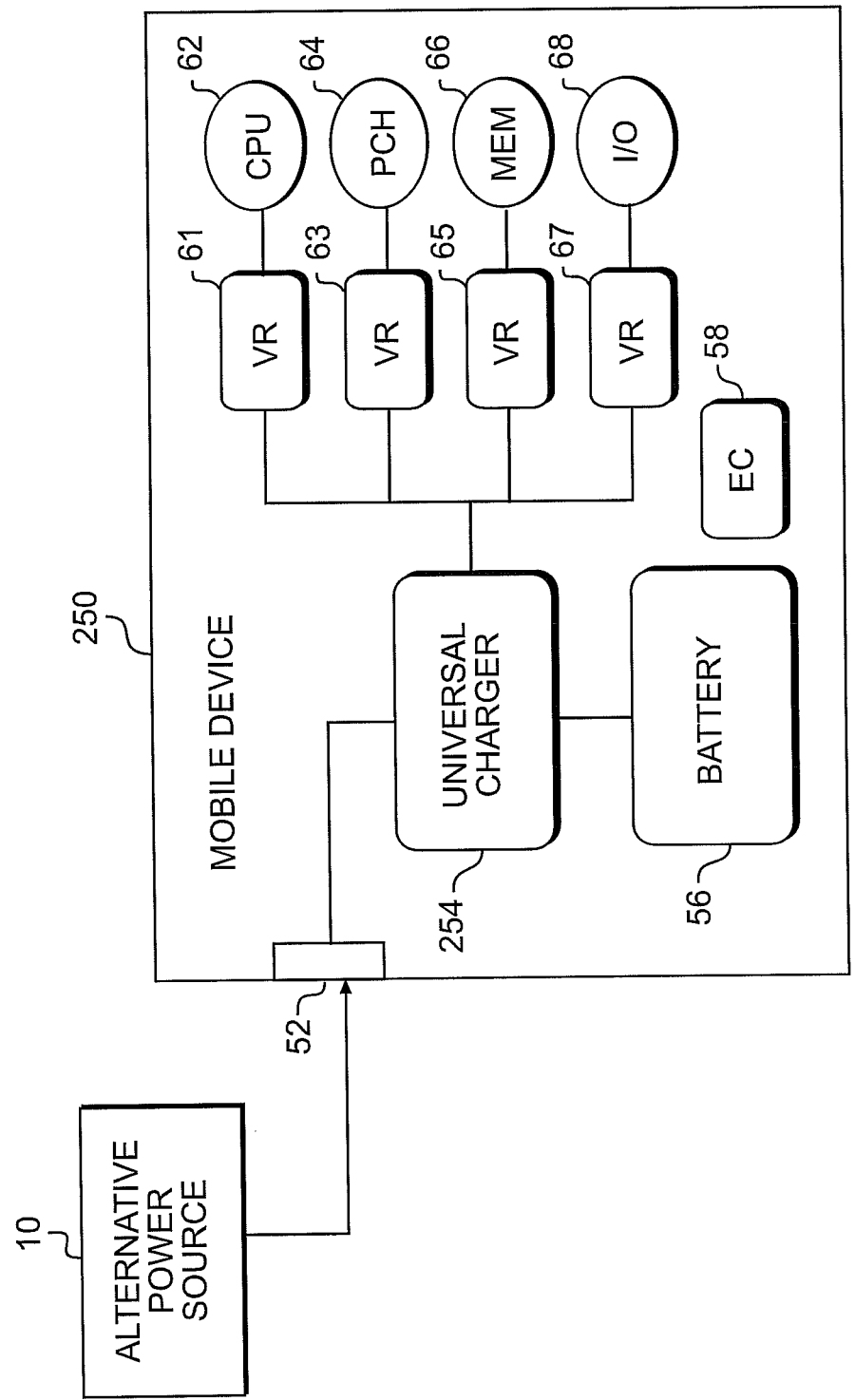

ELECTRONIC DEVICE TO BE POWERED BY ALTERNATIVE POWER SOURCE

BACKGROUND

1. Field

Embodiments may relate to an electronic device to be powered or charged using an alternative power source (or alternative energy source).

2. Background

Power availability and battery life are factors that impact user's experiences with mobile devices. Energy harvesting may provide an alternative power source. A charging system may be used to provide the alternative power to the mobile device.

BRIEF DESCRIPTION OF THE DRAWINGS

Arrangements and embodiments may be described in detail with reference to the following drawings in which like reference numerals refer to like elements and wherein:

FIG. 4 is a diagram of a mobile device to receive power from an alternative power source according to an example embodiment.

DETAILED DESCRIPTION

In the following detailed description, like numerals and characters may be used to designate identical, corresponding and/or similar components in differing figure drawings. Further, in the detailed description to follow, example sizes/models/values/ranges may be given although embodiments are not limited to the same. Where specific details are set forth in order to describe example embodiments, it should be apparent to one skilled in the art that embodiments may be practiced without these specific details.

Embodiments may relate to an electronic device such as a mobile device (or mobile terminal). Other electronic devices may also be used.

An electronic device (such as a mobile device) may utilize an alternative power source (or a harvested energy) in order to power (and/or charge) the electronic device. However, the alternative power source (or harvested energy) may be an unstable voltage supply and/or a variable power or energy source. That is, an output voltage and power from a harvester (or other device) may vary widely. As one example, an output voltage of a solar panel may range from zero volts (V) to a large open circuit voltage.

A power supply with such a wide voltage variation may not be directly applied to a mobile device (or any other computing device) since the mobile device may be designed to operate based on a power supply with stable (or regulated) voltage output. In order to maintain a constant voltage supply, a voltage regulator (VR) may be used. For example, a direct current/direct current (DC/DC) voltage regulator may be provided in a power delivery path in order to stabilize the output voltage. However, the DC/DC voltage regulator may be at a high cost and/or may provide low power efficiency and/or may not perform its function when connected to an unstable input supply.

Figure 1:
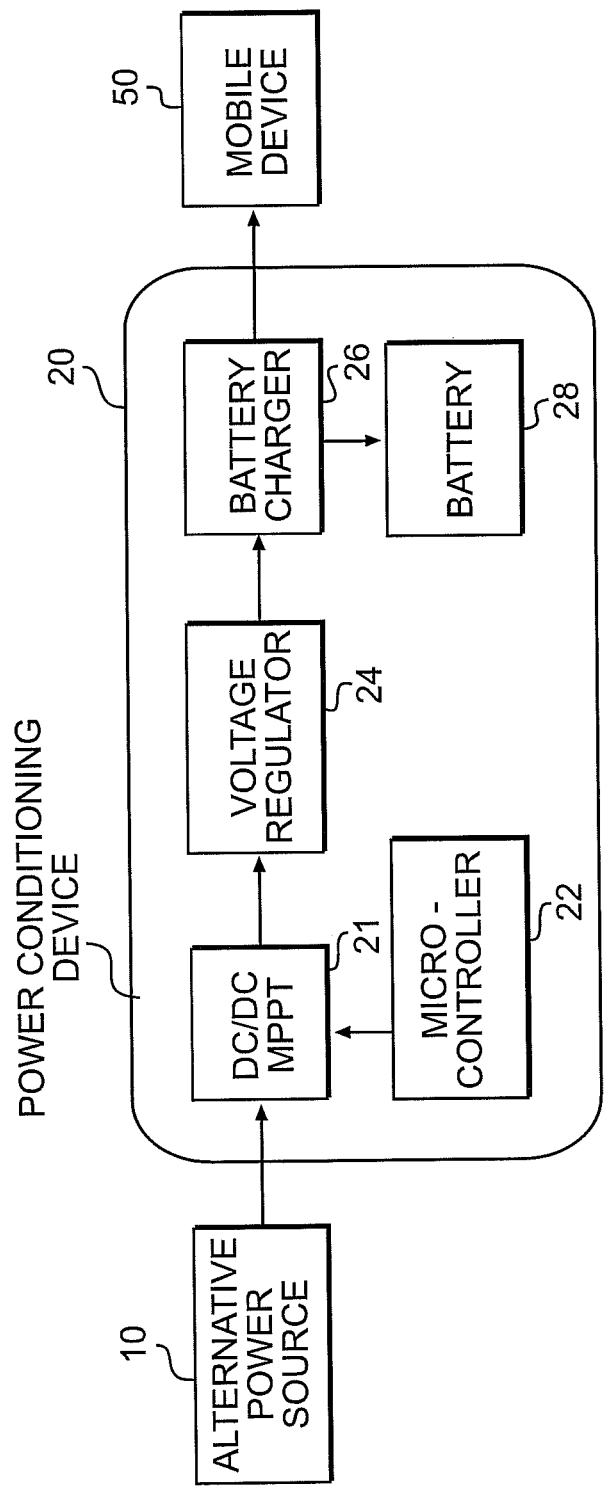
FIG. 1 is a diagram of a power conditioning device and a mobile device according to an example arrangement.

FIG. 1 shows a power conditioning device and an electronic device according to an example arrangement. Other arrangements may also be provided.

More specifically, FIG. 1 shows a power conditioning device 20 that includes components to charge and/or provide power (or energy) to a mobile device 50 by using an alternative power source 10 (or alternative energy source). FIG. 1 shows the power conditioning device 20 as being external to the mobile device 50. The power conditioning device 20 may be an external apparatus that is provided as one single unit in order to provide power conditioning and power storage between an alternative power source (or alternative power supply) and a mobile device. All components of the power conditioning device 20 may be provided within the single unit.

The mobile device 50 may be any one of a mobile terminal, a mobile computing platform, a mobile platform, a laptop computer, a tablet, an ultra-mobile personal computer, a mobile Internet device, a smartphone, a personal digital assistant, etc. The mobile device 50 may also be referred to as an electronic device. The mobile device 50 may be a device that has a battery backup.

The alternative power source 10 may be any one of a solar power source, a mechanical power source (such as via wind), a photovoltaic power source, a thermal power source, a radio frequency (RF) power source, a vibration power source, a mechanical power source (e.g. hand crank), a bio-mechanical power source, a fuel cell and/or any other power source.

The alternative power source 10 may provide power (or energy) to the power conditioning device 20. The power conditioning device 20 may provide a stable output voltage to the mobile device 50. The power conditioning device 20 may provide voltage regulation, energy storage and/or power processing, for example.

The power conditioning device 50 may include components such as a Maximum Power Point Tracking (MPPT) device 21 (such as logic and analog circuits to perform dynamic impedance matching), a microcontroller 22 (or controller), a voltage regulator 24 (such as a buck/boost voltage regulator), a battery charger 26 and a battery port to receive a battery 28.

The alternative power source 10 may provide an input power (or input energy) to the MPPT device 21. The MPPT device 21 may provide an output voltage to the voltage regulator 24 based at least in part on the power provided by the alternative power source 10. The microcontroller 22 may control the MPPT device 21. The MPPT device 21 may be considered a power processing stage of the power conditioning device 20.

The voltage regulator 24 may provide an output voltage to the battery charger 26 based at least in part on the input voltage (to the voltage regulator 50). The voltage regulator 24 may be a separate voltage regulator for DC supply or a voltage inverter for alternate current (AC) output.

The power conditioning device 20 may include the battery charger 26 and the battery port (and the battery 28) so that the entire power conditioning device 20 may be properly powered and/or to store received alternative power (or alternative energy).

The battery charger 26 may provide an output voltage to the battery 28 (provided at the power conditioning device 20). The battery 28 may be charged by the voltage received from the battery charger 26. The battery charger 26 and the battery 28 may be considered a storage unit for the power conditioning device 20.

Figure 2:
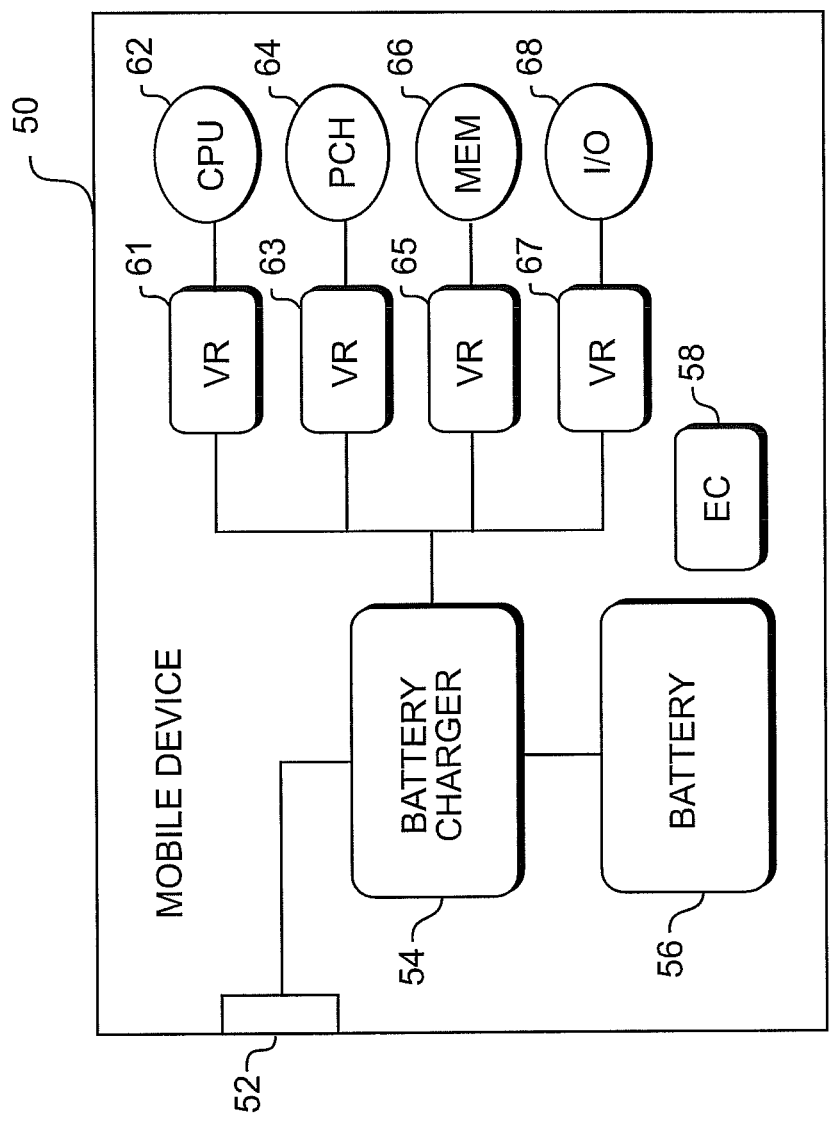
FIG. 2 is a diagram of a mobile device according to an example embodiment.

FIG. 2 is a diagram of a mobile device according to an example embodiment. Other embodiments and configurations may also be provided.

The mobile device 50 may include an input port 52, a battery charger 54, a battery port to receive a battery 56 and an embedded controller (EC) 58 (or controller).

The mobile device 50 may also include a voltage regulator (VR) and a load. As one example, the voltage regulator of the mobile device 50 may be a plurality of voltage regulators each to separately provide power to a separate load.

FIG. 2 shows a voltage regulator (VR) 61 for a processor 62, a voltage regulator 63 for a platform controller hub (PCH) 64, a voltage regulator 65 for a memory 66, and a voltage regulator 67 for an input/output (I/O) device 68. Other voltage regulators and/or loads may also be provided.

The input port 52 may receive an input voltage (and current) from a power condition device (such as the power conditioning device 20) or an AC/DC adapter. The battery charger 54 may provide an output (or energy) based on the voltage received at the input port 52. The battery charger 54 may be an integrated circuit on a motherboard. The embedded controller 58 may also be provided on the motherboard to control battery charging and/or discharging, and control power from the input port 52.

Embodiments may eliminate a power conditioning unit between an alternative power source and a mobile device. This may help avoid using a voltage regulator and battery charger (other than on the actual mobile device).

Figure 3:
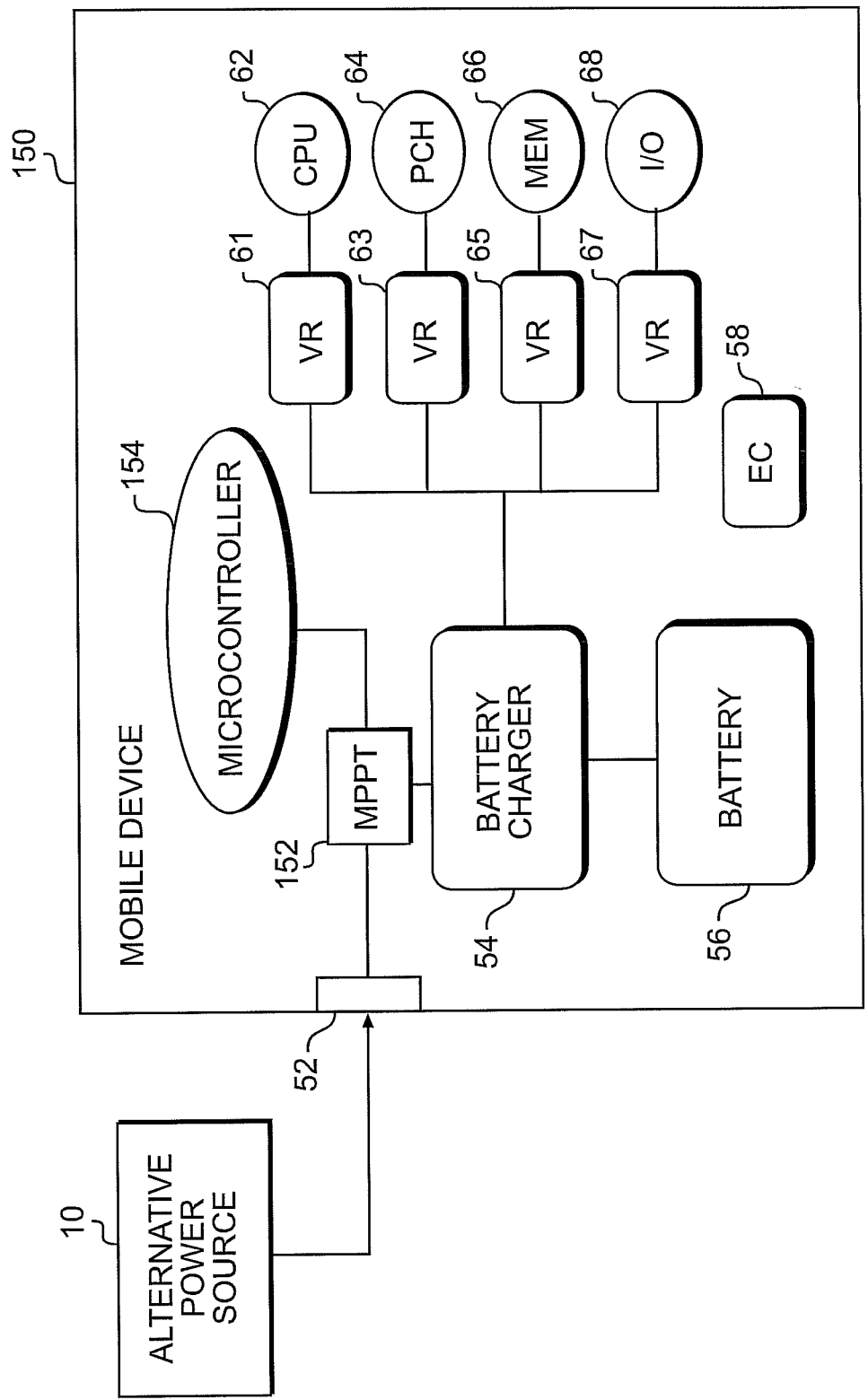
FIG. 3 is a diagram of a mobile device to receive power from an alternative power source according to an example embodiment.

FIG. 3 is a diagram of a mobile device to receive power from an alternative power source according to an example embodiment. Other embodiments and configurations may also be provided.

FIG. 3 shows a mobile device 150 coupled to the alternative power source 10. The mobile device 150 may generally correspond to the mobile device 50 discussed above. However, the mobile device 150 may include components to directly receive and process alternative power without utilizing an external power conditioning device.

The mobile device 150 may include the input port 52, an MPPT device 152, a microcontroller 154 (or controller), the battery charger 54, the battery port to receive the battery 56 and the embedded controller 58 (or the controller).

The mobile device 150 may also include a voltage regulator (VR) and a load similar to that discussed above with respect to FIG. 2. As one example, the mobile device 150 may include the voltage regulator 61 for the processor 62, the voltage regulator 63 for the platform controller hub (PCH) 64, the voltage regulator 65 for the memory 66, and the voltage regulator 67 for the input/output (I/O) device 68. Other voltage regulators and/or loads may also be provided.

The input port 52 may directly receive an input voltage (and current) from the alternative power source 10. The input port 52 may be directly connected to the alternative power source 10, without a power conditioning device (or unit) in between the mobile device 150 and the alternative power source 10.

The alternative power (or energy) source may be directly connected to the mobile device since the mobile device includes a battery back-up system (i.e., a battery pack and a battery charger controller). The mobile device may be used not only by a DC power supply but also by an alternative power (or energy) source.

Additionally, the MPPT device 152 (including logic and control circuitry) may be designed and integrated into the mobile device system. Under such a systematic approach, an additional voltage regulation stage (e.g. an additional DC/DC converter) may not be necessary since its output may be directly fed into a system battery charger and/or a voltage regulator for a system component that usually may operate under a certain range of its input voltage.

The MPPT device 152 may provide an output power to the battery charger 54 based at least in part on the power provided to the input port 152 from the alternative power source 10. The microcontroller 154 (or the controller) may control the MPPT device 152 or corresponding analog and logic circuits. The microcontroller 154 (or the controller) may be provided separately on a motherboard or integrated into a certain integrated circuit (IC) along with the MPPT device 152.

Although FIG. 3 shows the microcontroller 154 being separated from the other components of the mobile device, the microcontroller 154 may be provided as one of the controllers (such as a power manager unit or an embedded controller). The microcontroller 154 may contain a control algorithm to control the MPPT device 152 and the power distribution and delivery from the alternative power source 10.

The control algorithm may be implemented as codes that may be read by the microcontroller (or the processor or the controller) from a machine-readable medium. The machine-readable medium may be one of a ROM, a RAM, a CD-ROM, a magnetic tape, a floppy disk, an optical data storage device, etc. The machine-readable medium may include implementations in the form of carrier waves or signals (e.g. transmission via the Internet).

As one example, the control algorithm may control operations to receive information regarding power received from a power source to adjust a power characteristic (such as an impedance or a resistance), and to provide the adjusted power characteristic to a component (such as a voltage regulator).

The control algorithm may tune dynamically a source output impedance to achieve a maximum power output from a power source.

The MPPT device 152 may provide an output voltage to the battery charger 54. The MPPT device 152 may be integrated on the motherboard. As one example, the MPPT device 152 may include power transistors (such as field effect transistors), a driver circuit, passive components (such as a capacitor) and necessary control logics or electronics.

The MPPT device 152 (and the microcontroller 154) may be considered as an impedance matching device (or adjusting device) to tune dynamically the source output impedance to achieve the maximum power output from the power source. As one example, the impedance matching device may be implemented with an open-loop buck or boost DC/DC converter. The input impedance of such a circuit may be adjusted by varying a duty cycle of pulse width control (PWM) in the DC/DC converter.

The battery charger 54 may receive power from the MPPT device 152 and provide power (or energy) based on the power received from the MPPT device 152. The embedded controller 58 may control battery charging and/or discharging, and control power distribution and delivery from the input port 52.

Power from the battery charger 54 may be provided to the battery 56 and/or one of the voltage regulators 61, 63, 65, 67 (to provide a constant voltage to a load or loads).

FIG. 4 is a diagram of a mobile device to receive power from an alternative power source according to an example embodiment. Other embodiments and configurations may also be provided.

FIG. 4 shows a mobile device 250 coupled to the alternative power source 10. The mobile device 250 may generally correspond to the mobile device 50 discussed above. However, the mobile device 250 may include components to directly receive and process alternative power without utilizing an external power conditioning device.

The mobile device 250 may include the input port 52, a universal charger 254 (or a charger), the battery port to receive the battery 56 and the embedded controller 58 (or a controller).

The mobile device 250 may also include a voltage regulator (VR) and a load similar to that discussed above with respect to FIGS. 2-3. As one example, the mobile device 250 may include the voltage regulator 61 for the processor 62, the voltage regulator 63 for the platform controller hub (PCH) 64, the voltage regulator 65 for the memory 66, and the voltage regulator 67 for the input/output (I/O) device 68. Other voltage regulators and/or loads may also be provided.

The input port 52 may directly receive an input voltage (and current) from the alternative power source 10. The input port 52 may be directly connected to the alternative power source 10, without a power conditioning device (or unit) in between the mobile device 250 and the alternative power source 10.

The universal charger 254 may be a device to receive an input power from any of a number of power sources (such as alternative power sources or a DC power supply), and provide an output power to the battery 56 or one of the voltage regulators 61, 63, 65 or 67.

As one example, the universal charger 254 may determine a type of a power source (or energy source) provided from a power source connected to the input port 52. The universal charger 254 may provide adjustments to the received input power to achieve the maximum available power (such as MPPT) based on the determined type of the power source. The adjustments may also be to stabilize the supplied voltage, especially when an alternative power source may be provided.

The universal charger 254 may be considered an adjusting device to receive power from the input port, to adjust a power characteristic of the received power and to provide the stable or regulated supply voltage.

U.S. application Ser. No. 13/538,265, filed Jun. 29, 2012 describes one example of a universal charger. The universal charger 254 may include a decoder and a power impedance circuit, such as described in U.S. application Ser. No. 13/538,265. The decoder may determine the type of the received power based on voltage and/or current of the received power. The decoder may determine the type of power source based on identification information such as impedance or current-voltage characteristics provided or inherent with the received power. The decoder may include a look-up table and/or firmware in order to determine (or sense the received power source). The power impedance circuit may adjust impedance of the received power based on the determined power source. As one example, the power impedance circuit may adjust a resistance to increase stability of the received power. The universal charger 254 may also include a multiplexer circuit to provide the output power when multiple power sources may be provided to the mobile device.

The universal charger may provide impedance matching so that the proper output power is provided. This may be provided by adjusting resistance so as to get a maximum power source.

The universal charger may achieve impedance matching with a maximum point tracking algorithm based on a duty cycle auto-adjustment under a DC/DC power conversion circuit. This may involve adjusting the reflected or equivalent impedance at an output of a harvester, under any actual loading condition, in order to match a desired impedance of the harvester output, and therefore enable the maximum power output to be delivered from a source to a load.

Additionally and/or alternatively, the universal charger may include a power impedance circuit or a power impedance tuning device to address concerns associated with alternative power sources, namely variable power and/or unstable voltage output. The power impedance circuit may include impedance matching circuitry, on-the-fly power tracking control and tuning algorithm and/or other associated logic circuitry. The power impedance circuit may also consider environmental changes such as irradiation gradient for PV energy harvesting. As one example, maximum power point tracking (MPPT) techniques may be provided for solar energy harvesting.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile device comprising:
    an input port to directly receive power from a power source, the power source being one of at least three different types of power sources;
    an adjusting device to receive the power from the input port, and to adjust a power characteristic of the power, the adjusting device to include a maximum power point tracking (MPPT) device, a controller, and a charger, the controller to control the MPPT device based at least in part on a control algorithm, the maximum power point tracking device to receive power from the input port, the MPPT device to adjust a power characteristic of the received power based on a determined type of the received power of the at least three different types of power sources, and the maximum power point tracking device to provide the output power to the charger, and the charger to provide power based on the adjusted power characteristic, wherein the MPPT device and the controller to dynamically tune impedance of the power source to achieve a maximum power output;
    a component to receive, from the charger, the power output having the adjusted power characteristic; and
    wherein the component is a voltage regulator to receive the power having the adjusted power characteristic and to provide a regulated voltage.

2. The mobile device of claim 1, wherein the charger to receive power from any one of the at least three different power sources.

3. The mobile device of claim 1, wherein the power source is one of a solar power source, a mechanical power source, a photovoltaic power source, a thermal power source, a radio frequency power source, a vibration power source, a biomechanical power source or a fuel cell.

4. The mobile device of claim 1, wherein the component includes a plurality of voltage regulators, each voltage regulator to provide a separate regulated voltage to a different load of the mobile device.

5. A mobile device comprising:
an input port to directly receive power from an alternative power source, the alternative power source being one of a solar power source, a mechanical power source, a photovoltaic power source, a thermal power source, a radio frequency power source, a vibration power source, a biomechanical power source or a fuel cell;
an adjusting device to receive the power from the input port, and to adjust a power characteristic of the received power, the adjusting device to include a maximum power point tracking (MPPT) device, a controller and a charger, the controller to control the MPPT device based at least in part on a control algorithm, the maximum power point tracking device to receive power from the input port, the MPPT device to adjust a power characteristic of the received power based on a determined type of the received power, and the maximum power point tracking device to provide power to the charger, and the charger provide power based on the adjusted power characteristic, wherein the MPPT device and the controller to dynamically tune impedance of the power source to achieve a maximum power output; and
at least one voltage regulator to receive the power output having the adjusted power characteristic and to provide a regulated voltage.

6. The mobile device of claim 5, wherein the charger to receive power from the alternative power source.

7. The mobile device of claim 5, wherein the at least one voltage regulator includes a plurality of voltage regulators, each to separately provide a regulated power to a different load of the mobile device.

8. A system comprising:
a power source to provide a power; and
a mobile device to couple to the power source and to directly receive the power from the power source, the mobile device including:
an input port to directly receive the power from the power source,
an adjusting device to receive the power from the input port, and to adjust a power characteristic of the received power, the adjusting device to include a maximum power point tracking (MPPT) device, a controller, and a charger, the controller to control the MPPT device based at least in part on a control algorithm, the maximum power point tracking device to receive power from the input port, the MPPT device to adjust a power characteristic of the received power based on a determined type of the received power, and the maximum power point tracking device to provide power to the charger, and the charger to provide power based on the adjusted power characteristic, wherein the MPPT device and the controller to dynamically tune impedance of the power source to achieve a maximum power output, and
a voltage regulator to receive the output power having the adjusted power characteristic from the adjusting device and to provide a constant voltage to a load of the mobile device.

9. The system of claim 8, wherein the charger to receive power from any one of a plurality of different power sources.

10. The system of claim 8, wherein the power source is one of a solar power source, a mechanical power source, a photovoltaic power source, a thermal power source, a radio frequency power source, a vibration power source, a biomechanical power source or a fuel cell.

* * * * *